US012653185B2

(12) United States Patent
  Edly et al.

(10) Patent No.: US 12,653,185 B2
(45) Date of Patent: Jun. 16, 2026

(54) MICROCAPSULES ENCAPSULATING LAMBDA-CYHALOTHRIN

(71) Applicant: SYNGENTA CROP PROTECTION AG, Basel (CH)

(72) Inventors: Kal Edly, Greensboro, NC (US); Matthew Robert Cottle, Greensboro, NC (US)

(73) Assignee: SYNGENTA CROP PROTECTION AG, Basel (CH)

( * ) Notice: Subject to any disclaimer, the term of this patent is extended or adjusted under 35 U.S.C. 154(b) by 30 days.

(21) Appl. No.: 16/312,832

(22) PCT Filed: Jun. 23, 2017

(86) PCT No.: PCT/EP2017/065541

§ 371 (c)(1),
(2) Date: Dec. 21, 2018

(87) PCT Pub. No.: WO2018/001895

PCT Pub. Date: Jan. 4, 2018

(65) Prior Publication Data

US 2019/0350196 A1     Nov. 21, 2019

(30) Foreign Application Priority Data

Jun. 30, 2016   (GB) ..................................... 1611467

(51) Int. Cl.
  *A01N 25/28*        (2006.01)
  *A01N 53/00*        (2006.01)
(52) U.S. Cl.
  CPC ............. *A01N 25/28* (2013.01); *A01N 53/00* (2013.01)
(58) Field of Classification Search
  CPC ................................. A01N 25/28; A01N 53/00
  See application file for complete search history.

(56) References Cited

U.S. PATENT DOCUMENTS

| | | | |
|---|---|---|---|
| 4,285,720 A | 8/1981 | Scher | |
| 5,837,290 A | 11/1998 | Hasslin | |
| 5,846,554 A * | 12/1998 | Scher ..................... | A01N 25/04 |
| | | | 424/408 |
| 6,133,197 A | 10/2000 | Chen et al. | |
| 6,419,942 B1 | 7/2002 | Lo et al. | |
| 6,555,122 B2 | 4/2003 | Lo et al. | |
| 7,229,949 B2 | 6/2007 | Jadhav et al. | |
| 8,828,415 B2 | 9/2014 | Casaña et al. | |
| 9,241,912 B2 | 1/2016 | Taranta et al. | |
| 2005/0009834 A1 * | 1/2005 | Itoh ........................ | A01N 43/56 |
| | | | 514/252.03 |
| 2008/0254082 A1 * | 10/2008 | Toledano ............... | A01N 25/28 |
| | | | 424/408 |
| 2013/0115261 A1 | 5/2013 | Borzatta | |
| 2013/0210863 A1 * | 8/2013 | Dotan .................... | A01N 53/00 |
| | | | 514/341 |

FOREIGN PATENT DOCUMENTS

| | | |
|---|---|---|
| CN | 101460534 A | 6/2009 |
| CN | 103304772 A | 9/2013 |
| CN | 109691444 A | 4/2019 |
| JP | H06238159 A | 8/1994 |
| KR | 19990008105 A | 1/1999 |
| KR | 19990022458 A | 3/1999 |
| KR | 20070027760 A | 3/2007 |
| KR | 20140043326 A | 4/2014 |
| WO | 9633611 A2 | 10/1996 |
| WO | 9744125 A1 | 11/1997 |
| WO | 2589290 | 5/2013 |
| WO | 2015127051 A1 | 8/2015 |

OTHER PUBLICATIONS

International Search Report & Written Opinion for PCT/EP2017/065541 mailed on Jul. 19, 2017.
IPRP for PCT/EP2017/065541, mailed on Jan. 10, 2019.
UKIPO; App. No. GB 1611467.0; Combined Search and Examination Report under Sections 17 & 18(3) dated Dec. 23, 2016.

* cited by examiner

*Primary Examiner* — Hong Yu
(74) *Attorney, Agent, or Firm* — BakerHostetler; Toni-Junell Herbert

(57)                ABSTRACT

A composition comprising a microcapsule having a polyurea wall encapsulating a pyrethroid insecticide, wherein the polyurea wall of the microcapsule is made of polyurea polymers derived from a mixture of aromatic polyisocyanate (A) and aromatic diisocyanate (B), the weight ratio of (A) to (B) is 1:1, the polymer (or wall) content of each microcapsule is from 6 to 9% by weight, and the amount of the pyrethroid insecticide is from 15 to 60% by weight, each based on the weight of the microcapsule; such a composition providing improved worker exposure characteristics.

14 Claims, No Drawings

MICROCAPSULES ENCAPSULATING LAMBDA-CYHALOTHRIN

CROSS-REFERENCE TO RELATED APPLICATIONS

This application is a 371 National Stage application of International Application No. PCT/EP2017/065541, filed Jun. 23, 2017, which claims priority to Great Britain Application No. 1611467.0 filed Jun. 30, 2016, the entire contents of which applications are hereby incorporated by reference.

The present invention relates to certain compositions comprising microcapsules encapsulating a pyrethroid insecticide, and methods of controlling damage on plants with such compositions.

Microencapsulation of pesticides and other agricultural chemicals has been performed for a number of years, using various microencapsulation processes or techniques, and in connection with a number of different active ingredients.

WO 97/44125, WO 96/33611, WO 95/13698 and U.S. Pat. No. 4,285,720 each disclose microencapsulation of pesticides.

WO 97/44125 describes that pyrethroids, particularly lambda-cyhalothrin, when used for foliar application, should be encapsulated because of its risks to workers, but also the capsules should be such that lambda-cyhalothrin is relatively quick released for control of the target foliar pests.

The microencapsulation of different active ingredients requires different considerations, and WO 97/44125 teaches that a polyurea wall made from a certain mixture of isocyanates in a defined ratio would be preferred.

The inventors have found that microcapsules encapsulating pyrethroids should indeed have a specific defined polyurea wall, but the wall properties now found to be desirable are contradictory to the wall properties described in WO97/44125, in particular to provide improved worker exposure characteristics, such as an improved toxicology profile, whilst still maintaining effective pest control activity.

Accordingly, in a first aspect, the present invention provides a composition comprising a microcapsule having a polyurea wall encapsulating a pyrethroid insecticide, preferably lambda-cyhalothrin, wherein the polyurea wall of the microcapsule is made of polyurea polymers derived from a mixture of aromatic polyisocyanate (A) and aromatic diisocyanate (B), the weight ratio of (A) to (B) is about 1:1, the polymer (or wall) content of each microcapsule is from about 6 to about 9, preferably about 7 to about 8, % by weight, and the amount of the pyrethroid insecticide, preferably the lambda-cyhalothrin, is from about 15 to about 60, preferably about 20 to about 55, % by weight, each based on the weight of the microcapsule.

In a second aspect, the present invention provides an aqueous composition comprising the composition of the first aspect, provided the composition does not contain one or more of: an active ingredient having a melting point at 25° C. of less or equal to 50° C.; an active ingredient in salt form, and a free or dispersed hydrophobic oil phase.

In a further aspect, the present invention provides a composition comprising an aqueous composition of the first or second aspect and one or more other active ingredients.

In a further aspect, the present invention provides a method for controlling damage to a plant by a pest comprising applying an effective amount of a composition of each of the aspects of the invention to the pest, to the plant, or to its locus thereof.

In an embodiment of each aspect, the pyrethroid insecticide is lambda-cyhalothrin. The pyrethroid insecticide is present in the core of the capsules, and in the case of lambda-cyhalothrin, it is dissolved in the organic solvent.

In an embodiment of the first aspect, the d50 median diameter of the microcapsule in the composition is from about 0.5 to about 5, preferably about 1 to about 4, microns.

In an embodiment of the first aspect, the amount of the microcapsules in the composition is from about 45 to about 55, preferably about 47 to about 53, % by weight, based on the weight of the composition.

In an embodiment of the first aspect, the pyrethroid is present in an amount of from about 20 to about 55, preferably about 40 to about 50, more preferably about 43 to about 47, % by weight, based on the weight of the microcapsule.

In a further embodiment of the first aspect, the organic phase also comprises dispersed titanium dioxide particles having a d50 median particle size diameter of about 0.1 to about 0.6, preferably about 0.15 to about 0.5, microns, and are present in an amount of from about 3 to about 7, preferably about 3.5 to about 6, % by weight, based on the weight of the microcapsule.

In an embodiment, the aromatic polyisocyanate is polymethylene polyphenylisocyanate and the aromatic diisocyanate is toluene diisocyanate, preferably an isomeric mixture of toluene diisocyanate, such as about 80% 2,4-isomer and about 20% 2,6-isomer of toluene diisocyanate.

In an embodiment of the first aspect, the composition comprises a microcapsule having a polyurea wall encapsulating lambda-cyhalothrin and dispersed titanium dioxide particles, wherein the polyurea wall of the microcapsule is made of polyurea polymers derived from a mixture of polymethylene polyphenylisocyanate (A) and an isomeric mixture of toluene diisocyanate (B), provided that the d50 median particle size diameter of the titanium dioxide particles is from about 0.15 to about 0.5 microns, the d50 median diameter of the microcapsule in the composition is from 1 to 4, microns, the weight ratio of (A) to (B) is about 1:1, the polymer (or wall) content of each microcapsule is from about 7 to about 8, % by weight, the amount of titanium dioxide is present in an amount of from about 3.5 to about 6, % by weight, and the amount of the lambda-cyhalothrin, is from about 40 to about 50, % by weight, each based on the weight of the microcapsule; and further provided the amount of the microcapsule in the composition is from about 47 to about 53, % by weight, based on the weight of the composition.

The general processes for making the microencapsulated formulations of the invention are described in WO 97/44125. However, as noted, one of the essential differences is the ratio of the isocyanate monomers used to make the polyurea microcapsule wall.

Accordingly, the process, in brief, involves encapsulation of a water immiscible material (in the present case preferably an organic phase containing a pyrethroid insecticide) within discrete capsules of polyurea. In this process, hydrolysis of an isocyanate monomer to form an amine via a carbamic acid intermediate occurs, and that in turn reacts with another isocyanate monomer to form the polyurea. In general, the process comprises two stages.

In the first stage, a physical dispersion of a water-immiscible phase in an aqueous phase is prepared. The water-immiscible phase comprises the pesticide to be encapsulated together with other material as described below. As is known in the art, the dispersion is produced by a high shear device, and this step is carried out until the desired droplet size (as discussed below) is obtained. Only mild agitation is required for the remainder of the process.

In the second stage, the dispersion is stirred under high shear and maintained at a temperature range of from about 20° C. to about 90° C., during which reaction occurs involving the organic diisocyanate and organic polyisocyanate to form the polyurea at the interfaces between the droplets of the organic phase and the aqueous phase. Adjustment of the pH of the resulting mixture and the temperature range during the second stage advance this condensation reaction.

The aqueous phase is prepared from water, a protective colloid, and preferably a surfactant.

In general, the surfactant or surfactants in this phase may be anionic or nonionic surfactants with an HLB range of from about 12 to about 16. If more than one surfactant is used, individual surfactants may have HLB values lower than 12 or higher than 16 as long as the overall HLB value of the combined surfactants will be within the range of about 12 to 16. Suitable surfactants include polyethylene glycol ethers of linear alcohols, ethoxylated nonylphenols, naphthalene sulfonates, salts of long chain alkyl benzene sulfonates, block copolymers of propylene and ethylene oxides, anionic/nonionic blends, and the like. Preferably the hydrophobic portion of the surfactant has chemical characteristics similar to the water-immiscible phase. Thus, when the latter contains an aromatic solvent, one suitable surfactant would be an ethoxylated nonylphenol. Particularly preferred surfactants include block copolymers of propylene oxide and ethylene oxide, and anionic/nonionic blends.

The protective colloid present in the aqueous (or continuous) phase must absorb strongly onto the surface of the oil droplets and can be selected from a wide range of such materials including polyacrylates, methyl cellulose, polyvinyl alcohol, polyacrylamide, poly (methylvinyl ether/maleic anhydride), graft copolymers of polyvinyl alcohol and methylvinyl ether/maleic acid [hydrolyzed methyl vinyl ether/maleic anhydride (see U.S. Pat. No. 4,448,929, which is hereby incorporated by reference herein)]; and alkali metal or alkaline earth metal lignosulfonates. Preferably, however, the protective colloid is selected from alkali metal and alkaline earth metal lignosulfonates, most preferably sodium lignosulfonates, such as TERGITOL™ NP7, Tergitol XD, Tergitol NP40, Tergitol 15-S-20, WITCONATE™ 90.

The range of surfactant concentration in the process is from about 0.01 to about 10.0 percent by weight, based on the aqueous phase, but higher concentrations of surfactant may also be used. The protective colloid is generally present in the aqueous phase in an amount of from about 0.1 to about 5.0 percent by weight. The amount of protective colloid employed will depend on various factors, such as molecular weight, compatibility, etc., so long as enough is present to completely coat the surfaces of all the oil droplets. The protective colloid can be added to the aqueous phase prior to the addition of the organic phase, or can be added to the overall system after the addition of the organic phase or the dispersion of it. The surfactants should be chosen so as to not displace the protective colloid from the droplet surfaces.

The organic phase comprises the pyrethoid to be encapsulated, one or more solvents, an aromatic diisocyanate and an aromatic polyisocyanate. Suitable solvents include aromatic hydrocarbons such as xylenes, naphthalenes, or mixtures of aromatics; aliphatic or cycloaliphatic hydrocarbons such as hexane, heptane and cyclohexane; alkyl esters including alkyl acetates and alkyl phthalates, ketones such as cyclohexanone or acetophenone, chlorinated hydrocarbons, vegetable oils, or mixtures of two or more such solvents. Preferably the pyrethroid is lambda-cyhalothrin and is dissolved in the organic solvent.

In the event a UV protectant, such as titanium dioxide, is used, this would be encapsulated too and so titanium dioxide particles are comprised in the organic phase too, as well as dispersants used in dispersing the particles. The dispersants useful for dispersing the titanium dioxide particles are certain non-ionic surfactants which act by steric hindrance and are active only at the protectant solid/organic liquid interface and do not act as emulsifying agents. Such dispersants are suitably made up of (a) a polymeric chain having a strong affinity for the liquid and (b) a group which will absorb strongly to the solid. Examples of such dispersants are those of the HYPERMER™ and ATLOX™ lines, including Hypermer PS1, Hypermer PS2, Hypermer PS3, Atlox LPI, Atlox LP2, Atlox LP4, Atlox LP5, Atlox LP6, and Atlox 4912; and AGRIMER™ polymers such as Agrimer AL-216 and AL-220.

The present inventors have found that by carefully modifying the microcapsule properties, such as the ratio of the aromatic polyisocyanate to the aromatic diisocyanate, and the polymer wall content and amount, microcapsules are obtained providing improved work exposure characteristics (such as improved toxicology profile, e.g., at least one of better oral, dermal, and inhalation toxicity, improved skin and eye irritation, and a better skin sensitizer), but which are still relatively quickly released when applied in an agricultural environment. The walls are formed only of a mixture of aromatic diisocyanates with an aromatic polyisocyanate, in which the weight ratio of polyisocyanate to diisocyanate is about 1:1.

The diisocyanate and the polyisocyanates which may be used in this invention are those described in U.S. Pat. No. 4,285,720. Diisocyanates usable in the process of this invention include m-phenylene diisocyanate, p-phenylene diisocyanate; 1-chloro-2,4-phenylene diisocyanate; 4,4'-methylenebis(phenyl isocyanate); 3,3'-dimethyl-4,4'-biphenylene diisocyanate; 4,4'-methylenebis(2-methylphenyl isocyanate); 3,3, dimethoxy4,4'-biphenylene diisocyanate; 2,4-tolulene diisocyanate; 2,6-tolulene diisocyanate, isomeric mixtures of 2,4- and 2,6-toluene diisocyanates; and 2,2',5,5-tetramethyl-4,4'-biphenylene diisocyanate. Preferred are isomeric mixtures of 2,4- and 2,6-toluene diisocyanates.

Aromatic polyisocyanates usable in this invention have 3 or more isocyanate groups and include polymethylene polyphenylisocyanate, triphenylmethane triisocyanate (DESMODUR™ R) and the adduct formed between 1 mole of trimethyloipropane and 3 moles of tolulene diisocyanate ("Desmodur TH").

While the prior art discloses the uses of mixtures of these two types of isocyanates, specifically toluene diisocyanate and polymethylene polyphenylisocyanate, with many active ingredients, the teaching in respect of pyrethroids suggests a higher amount of toluene diisocyanate than the polymethylene polyphenylisocyanate.

The total amount of organic isocyanates used in the process will determine the wall content of the microcapsules formed. In general, the isocyanates (and correspondingly the microcapsule walls formed from them) will comprise from about 6 to about 9 percent by weight of the microcapsule, preferably from about 7 to about 8 percent by weight.

The size of the microcapsules produced, which corresponds to the droplet size of the organic phase in the oil-in-water emulsion, is about d50 median diameter of from 0.5 to 5, preferably 1 to 4, microns. The droplet size can be adjusted by the stirring speed and time, and by the type and amount of surfactant employed, as generally known in the art.

To obtain the appropriate emulsion, the organic phase is added to the aqueous phase with stirring. A suitable dispersing means is employed to disperse the organic phase in the aqueous phase. This means may be any high shear device, operated so as to obtain the desired droplet (and corresponding microcapsule particle) size within the range of about 0.5 to about 5, preferably about 1 to about 4 microns. Once the proper droplet size is obtained, the dispersion means is discontinued and only mild agitation is required for the remainder of the process.

To form the microcapsules, the temperature of the two-phase mixture is then raised from ambient to a value of from about 20° C. to about 90° C., preferably about 40° C. to about 90° C. Depending on the system, as described in U.S. Pat. No. 4,285,720, the pH value may be adjusted to an appropriate level.

The microencapsulated composition of the present invention may also contain conventional formulation aids, such as bactericides, antifoams, antifreeze agents, pH adjusters, buffers and viscosity control agents.

In a further aspect, the present invention provides a process for preparing a composition as defined in the first aspect, which process comprises the steps of (a) preparing an organic phase comprising a pyrethroid insecticide, preferably lambda-cyhalothrin, to be encapsulated, aromatic polyisocyanate (A), aromatic diisocyanate (B), wherein the weight ratio of the (A) to (B) is 1:1, and optionally titanium dioxide particles having d50 median particle size of 0.1 to about 0.6, preferably 0.15 to about 0.5, microns, dispersed in the organic phase by means of a dispersant; (b) introducing the organic phase into an aqueous phase comprising water, a protective colloid, and optionally a surfactant to form a dispersion of the organic phase in the aqueous phase; (c) mixing the dispersion under high shear to form an oil-in-water emulsion in which the oil droplets of the emulsion have a d50 median diameter of from 0.5 to 5, preferably 1 to 4, microns; (d) adjusting as necessary the temperature and/or pH of the oil-in-water emulsion such that a polymerization reaction occurs forming polyurea microcapsules containing the organic phase.

The microencapsulated formulation of the invention is an aqueous formulation containing capsules and so would have the formulation designation code CS. The microencapsulated formulations of the present invention are storage stable and have acceptable handling characteristics, so can be satisfactorily applied, for example, in a field of plants. To ensure the capsule integrity of such CS formulations, the aqueous composition comprising the capsules does not contain one or more of: an active ingredient having a melting point at 25° C. of less of equal to 50° C.; an active ingredient in salt form, and a free or dispersed hydrophobic oil phase.

The microencapsulated compositions of the invention can be combined with other active ingredients.

In an embodiment, an aqueous composition of the present invention comprises the encapsulated lambda-cyhalothrin of the first aspect and one or more other insecticides and/or acaricides, preferably the one or more other insecticides and acaricides are not encapsulated with the pyrethroids.

Examples of one or more other active ingredients are from the class neonicotinoids (such as imidacloprid, acetamiprid, thiamethoxam, thiacloprid), carbamates, botanical compounds, diamides (such as chloroantraniliprole), macrocyclic lactones (such as abamectin, spinosad and emamectin), organophosphorus compounds (such as acephate), tetramic acids (such as spirotetramat), tetronic acids (such as spiromesifen, spriodiclofen) and insect growth regulators (such as lufenuron).

The other active ingredient is normally suspended in the aqueous composition comprising the capsules of the invention using conventional formulation techniques; as necessary further conventional formulation aids are used to prepare a stable mixture formulation, wherein the resulting formulation would have designation ZC code.

In an embodiment, an aqueous composition of the present invention comprises an encapsulated lambda-cyhalothrin of the first aspect and, as a further active ingredient, suspended thiamethoxam or suspended acetamiprid.

In a further embodiment, an aqueous composition of the present invention comprises encapsulated lambda-cyhalothrin of the first aspect, and, as further active ingredients, suspended thiamethoxam or suspended acetamiprid, and suspended lufenuron.

The d50, as used herein, refers to the $50^{th}$ percentile rank, or median value, as measured on a volumetric basis by CIPAC method MT 187 for particle size analysis by laser diffraction. Malven S, 2000 or 3000 instruments are the industry standard for measuring particle size by light diffraction, but similar instruments made by Cilas, Coulter-Beckman, Horiba, Sympatec and others equivalents are also acceptable.

General Procedure for an Encapsulated Formulation of the Invention

A solution of lambda-cyhalothrin in SOLVESSO 200 solvent was prepared. The dispersants were added followed by the titanium dioxide, and the resulting suspension agitated with a high shear stirrer. After the titanium dioxide was well dispersed, polymethylene polyphenylisocyanate and isomeric mixture of toluene diisocvanate were added to complete the organic phase.

This phase was introduced to the aqueous phase with agitation with a high shear stirrer to form an oil-in-water emulsion. The median droplet size was about 3.0±1 microns. The temperature was then raised to 50° C. over a 30-minute period while maintaining mild agitation, and then maintained at 50° C. for 3 hours. The resulting suspension of microcapsules was allowed to cool to room temperature and other formulation aids, such as viscosity control agent(s), and bactericide were added and, the pH was adjusted to 5.0.

The compositions of the present invention are suitable for control of pests by foliar application, but other applications as well, such as to soil or in or around buildings. Examples of pests are sucking insects (e.g. psyllids, thrips (e.g. Thrips tabaci) stink bugs (e.g. *Euschistus heros*), plant hoppers and aphids (e.g. *Aphis gossypii, Myzus persicae*)) and chewing insects (e.g., Helicoverpa and diamondback moth (DBM), caterpillars, beetles, and slugs and snails).

Suitable target plants are especially potatoes, cereals, (wheat, barley, rye, oats), rice, maize, tree nuts, alfalfa, head and stem *brassica* (including but not limited to broccoli, cabbage, cauliflower), sugar beet, cotton, millet varieties, sorghum, tobacco, sun flowers, beans, peas, oil plants (rape, canola), soybeans, cabbages, tomatoes, eggplants (aubergines), pepper and other vegetables, and spices as well as ornamental shrubs and flowers. The target crops also include transgenic crop plants of the foregoing varieties.

Depending on the aims to be achieved and give circumstances, the compositions of the present invention are applied at a rate per hectare, based on the active ingredient, of from 1 to 500 g/ha, such as 5 to 300 g/ha, for example, 10 to 100 g/ha.

The Examples which follow serve to illustrate the invention. The invention can be distinguished from other prior art by virtue of greater efficacy at low application rates and improved toxicological profile, which can be verified by the person skilled in the art using the experimental procedures outlined in the Examples below, using lower rates if necessary.

EXAMPLES

The key components and characteristics of the polyurea microcapsule formulations are indicated in Tables 1 and 2, each formulation is a CS formulation type.

The general procedure for preparation of the microencapsulated lambda-cyhalothrin products is described in Example 3 of WO97/44125.

Tables 1 and 2 provide details of the different lam bda-cyhalothrin encapsulated formulations. Each formulation in Tables 1 and 2 contained titanium dioxide in the microcapsules in an amount of about 4.6% (based on the weight of the microcapsule) and had a d50 median particle size of about 0.2 to 0.4 microns.

Some of the encapsulated lambda-cyhalothrin formulations were then combined with thiamethoxam, or both thiamethoxam and lufenuron. The 2-way (lambda-cyhalothrin & thiamethoxam) and 3-way (lambda-cyhalothrin, thiamethoxam & lufenuron) mixture formulations were of the ZC formulation type, which is a formulation containing capsules and also suspended solid particles. The thiamethoxam and lufenuron were suspended in the aqueous phase and the lambda-cyhalothrin was encapsulated in the microcapsules. The 2-way mixture and 3-way mixture formulated products were prepared using conventional formulating practices, such as incorporating suitable bactericides, surfactants, dispersants, antifreeze, and viscosity control agents to suspend the active ingredients and/or microcapsules and improve storage stability.

Details of the resulting 2-way mixture and 3-way mixture formulated products are given in table 3.

Biology

B1: Release Characteristics of Different Capsules of Lambda-Cyhalothrin

A sample of the CS formulation (0.30-0.35 g) is weighed into a 2 oz. round glass bottle. 6 ml of water is then added and the sample is dispersed with gentle shaking until homogenous. Using a volumetric dispensing unit or pipette, dispense 50 ml of Internal Standard (IS) (which is dicyclohexyl phthalate in hexanes at a concentration of 0.35 mg/m). The bottle is then placed on a horizontal orbital shaker set to 200±10 rpm & a timer is started. After 5 min, 1 ml sample is removed from the organic phase and transferred through a 0.45 μm nylon syringe filter into a GC vial to which 25 μl of trifluoroacetic acid (TFA) is added via pipette to prevent conversion of lambda cyhalothrin to the Cis A isomer. The sample is then capped immediately and analysed by gas chromatography for lambda cyhalothrin content.

The same sampling procedure is repeated at 0.5, 2, 4, 8, 24, and 96 hour intervals and the resulting concentration of lambda Cyhalothrin is plotted as a function of time to determine the capsule release rate profile.

Results of certain formulations are given in the Tables A.

B2: Efficacy Trials for *Euschistus heros* (Nymphs & Adults)

The efficacy of Example 3, L and M were assessed against each other in the field. Each formulation was applied on soybean about ten weeks after the planting date in an amount of 200 ml/ha in separate 96 m$^2$ randomised block plots in Brazil. The stinkbug nymphs (of the third instar and above) and adults were counted using a standardized monitoring device three, seven and ten days after application of the formulation. A plot with no treatment was also assessed for the stinkbug nymphs and adults as the check. The each trial was carried out in four replicates.

The average of the three assessments (three, seven and ten days after application) compared to the check for each of the formulations are provided in Table B.

Safety and Toxicology

Certain formulations were assessed for one or more of oral toxicity, dermal toxicity, inhalation risk, skin irritation, eye irritation and skin sensitisation (LLNA) using OECD test methods indicated below in Table C.

Table D provides the results of the tests.

TABLE 1

Encapsulated Lambda-cyhalothrin formulations I

| | Example 1 | Example A | Example B | Example C |
|---|---|---|---|---|
| % weight of lambda-cyhalothrin | 22.8 | 22.8 | 22.8 | 9.7 |
| % weight of isocyanate monomers | 3.8 | 3.8 | 3.8 | 2.8 |
| ratio of polymethylene polyphenylisocyanate to isomeric mixture of toluene diisocyanate (80%, 2,4-isomer; 20% 2.6-isomer) | 1:1 | 1:30 | 1:30 | 1:1 |
| % weight of organic phase | 49.7 | 50.6 | 49.7 | 21.4 |
| % weight of aqueous phase | 50.3 | 49.3 | 50.3 | 78.6 |
| d50 median diameter of microcapsules, microns | 1.5-3.5 | 1.5-3.5 | 1.5-3.5 | 10-12 |
| % weight of polyurea polymer (or wall content) of capsule | 7.7 | 7.5 | 7.7 | 13.1 |

TABLE 2

Encapsulated Lambda-cyhalothrin formulations II

| | Example E | Example F | Example G | Example H |
|---|---|---|---|---|
| % weight of lambda-cyhalothrin | 22.8 | 22.8 | 22.8 | 22.8 |
| % weight of isocyanate monomers | 5.9 | 5.9 | 3.8 | 3.8 |
| ratio of polymethylene polyphenylisocyanate to isomeric mixture of tolyene diisocyanate (80%, 2,4-isomer; 20% 2.6-isomer) | 1:30 | 1:15 | n/a | 1:15 |

TABLE 2-continued

| | Example E | Example F | Example G | Example H |
|---|---|---|---|---|
| % weight of organic phase | 52.4 | 52.4 | 49.7 | 49.7 |
| % weight of aqueous phase | 47.7 | 47.7 | 50.3 | 50.3 |
| d50 median diameter of microcapsules, microns | 10-12 | 10-12 | 1.5-3.5 | 1.5-3.5 |
| % weight of polyurea polymer content (or wall content) of capsule | 11.2 | 11.2 | 7.7 | 7.7 |

*Encapsulated Lambda-cyhalothrin formulations II*

TABLE 3

2 and 3-way mixture formulation of encapsulated Lambda-cyhalothrin formulations

| | Example 2 | Example I | Example J | Example K | Example 3 | Example L |
|---|---|---|---|---|---|---|
| source of encapsulated lambda-cyhalothrin formulation | Example 1 | Example A | Example B | Example B | Example 1 | Example B |
| wt % of lambda-cyhalothrin | 9.48 | 9.48 | 9.48 | 9.48 | 8.80 | 8.80 |
| wt % of thiamethoxam | 12.60 | 12.60 | 12.60 | 12.60 | 13.20 | 13.20 |
| wt % of lufenuron | | | | | 6.60 | 6.60 |

Comparative L contained similar components in similar amounts as Comparative K apart form a using lower amount, i.e., 0.19 wt % rather than 0.28 wt %, of the anti-microbial component (PROXEL ™ GXL) - a 20% aqueous dipropylene glycol solution of 1,2-benzisothiazolin-3-one.

TABLE A1 release profile (based on weight) of Lambda-Cyhalothrin over 96 hours*

| time, hrs | Example 1 | Example B | Example C | Example E | Example F | Example G | Example H |
|---|---|---|---|---|---|---|---|
| 0.1 | 0 | 0.11 | 0.07 | 0.97 | 1.36 | 0 | 0.35 |
| 0.5 | 0.04 | 0.6 | 0.27 | 2.9 | 3.64 | 0.03 | 0.58 |
| 2 | 0.19 | 1.71 | 1.13 | 6.17 | 8.61 | 0.19 | 1.39 |
| 4 | 0.62 | 4.99 | 2.48 | 8.58 | 11.61 | 0.56 | 3.24 |
| 8 | 1.93 | 19.84 | 7.52 | 15.01 | 18.16 | 2.3 | 15.27 |
| 24 | 7.26 | 25.72 | 23.38 | 27.4 | 25.6 | 17.39 | 26.6 |
| 96 | 22.74 | 25.67 | 27.13 | 27.27 | 25.59 | 30.14 | 26.59 |

*all formulations had comparable storage stability.

TABLE A2 release profile (based on %) of Lambda-Cyhalothrin over 96 hours (from Table A1)

| time, hrs | Example 1 | Example B | Example C | Example E | Example F | Example G | Example H |
|---|---|---|---|---|---|---|---|
| 0.1 | 0.0% | 0.5% | 0.3% | 4.3% | 6.0% | 0.0% | 1.5% |
| 0.5 | 0.2% | 2.6% | 1.2% | 12.7% | 16.0% | 0.1% | 2.5% |
| 2 | 0.8% | 7.5% | 5.0% | 27.1% | 37.8% | 0.8% | 6.1% |
| 4 | 2.7% | 21.9% | 10.9% | 37.6% | 50.9% | 2.5% | 14.2% |
| 8 | 8.5% | 87.0% | 33.0% | 65.8% | 79.6% | 10.1% | 67.0% |
| 24 | 31.8% | 112.8% | 102.5% | 120.2% | 112.3% | 76.3% | 116.7% |
| 96 | 99.7% | 112.6% | 119.0% | 119.6% | 112.2% | 132.2% | 116.6% |

TABLE B

Efficacy against *Euschistus heros* (nymphs & adults)

| | % control | |
|---|---|---|
| | nymphs | adults |
| Example 3 | 80 | 74 |
| Example L | 80 | 78 |

TABLE C

OECD methods used in the tests in Table D, and a brief description

| Test assessment | OECD test method | Brief description |
|---|---|---|
| Acute Oral | OECD 425 | The method permits estimation of an LD50 with a confidence interval and the results allow a substance to be classified for acute toxicity according to the Globally Harmonised System of classification and labelling of chemicals.<br>It is easiest to apply to materials that produce death within couple of days. This Test Guideline is intended for use with rodents (rat female preferably). There are a limit test and a main test. The limit test can be used efficiently to identify chemicals that are likely to have low toxicity. The test substance is administered generally in a single dose by gavage to animals fasted prior to dosing. Single animals are dosed in sequence usually at 48 h intervals. The first animal is dosed a step below the best preliminary estimates of the LD50. The second animal receives a lower dose (if the first animal dies) or a higher dose (if the first animal survives). Animals are observed with a special attention given during the first 4 hours and daily thereafter, for a total of 14 days generally. Weights Animals should be determined at least weekly. All the animals should be subjected to gross necropsy. Globally the LD50 is calculated using the maximum likelihood method. Following this, it may be possible to compute interval estimates for the LD50; most narrow is the interval and better is LD50 estimation. |
| | OECD 223 | This Test Guideline describes procedures designed to estimate the acute oral toxicity of substances to birds, and it provides three testing options: (1) limit dose test, (2) LD50-slope test, and (3) LD50-only test. The LD50-slope and LD50-only options are sequential testing procedures. The test method selected will depend on whether or not a definitive median dose (LD50) and slope of the dose-response curve are both needed. The limit dose test is the preferred test when toxicity is expected to be low and lethality is unlikely at the limit dose. The limit dose should be adequate for assessment purposes, and it is usually 2000 mg/kg-bwt. Five or ten birds are tested at the limit dose in addition to a control group. The LD50-slope test is the preferred test when regulatory or other requirements determine that the slope of the dose-response curve and/or the confidence interval is required in addition to an estimate of the LD50. This is a 3- or 4-stage test with 24 or 34 birds in addition to a control group. The LD50-only test is the preferred test when regulatory or other requirements determine that only the median lethal dose is required but neither the slope of the dose response curve or the confidence interval for the LD50 is required. This may be the appropriate test to estimate a percentile of a species sensitivity distribution of LD50s and to provide information for product labelling purposes. This test has two stages, with 14 birds in addition to a control group. |
| Acute Dermal | OECD 402 | This method provides information on health hazard likely to arise from a short-term exposure to solid or liquid test substance by the dermal route.<br>This Test Guideline is intended primarily for use with rodents (rat, rabbit or guinea pig may be used). For each dose at least 5 animals (of the same sex) are used. The test substance is applied to the skin (not less than 10 percent of the body surface area) in graduated doses to several groups of experimental animals, one dose being used per group. At least three dose levels should be used, appropriately spaced to produce a dose-response curve. A limit test of at least 2000 mg/kg could be made. The observation period should be at least 14 days. During the first day the animals should be observed frequently and then the observations should be made daily. Necropsy of all animals should be carried out and all gross pathological changes should be recorded. A study of acute toxicity by the dermal route and determination of a dermal LD provides an estimate of the relative toxicity of a substance by the dermal route of exposure and they may serve as a basis for classification and labeling. It is an initial step in establishing a dosage regimen in subchronic and other studies and may provide information on dermal adsorption and the mode of toxic action of a substance by this route. |
| Acute Inhalation | OECD 403 | This method provides information on health hazard likely to arise from short-term exposure to a test article (gas, vapour or aerosol/particulate test article) by inhalation.<br>The revised Test Guideline describes two studies: a traditional LC50 protocol and a Concentration × Time (C × t) protocol. It can be used to estimate a median lethal concentration (LC50), non-lethal threshold concentration (LC01) and slope, and to identify possible sex susceptibility. This Test Guideline enables a test article quantitative risk assessment and classification according to the Globally Harmonized System for the Classification and Labelling of Chemicals. In the traditional LC50 protocol, animals are exposed to one limit concentration or to three concentrations, at least, for a predetermined duration, generally of 4 hours. Usually 10 animals should be used for each concentration. In the C × T protocol, animals are exposed to one limit concentration or a series of concentrations over multiple time durations. Usually 2 animals per C × t interval are used. Animals (the preferred species is the rat) should be observed for at least 14 days. The study includes measurements (including weighing), daily and detailed observations, as well as gross necropsy. |
| Skin Irritation | OECD 404 | This method provides information on health hazard likely to arise from exposure to liquid or solid test substance by dermal application. This Test Guideline recommends sequential testing strategies, which include the performance of validated and accepted in vitro or ex vivo tests for corrosion/irritation.<br>The albino rabbit is the preferable laboratory animal. The substance to be tested is applied in a single dose to a small area of skin (approximately 6 cm$^2$) of an experimental animal; untreated skin areas of the test animal serve as the control. The exposure period is 4 hours. Residual test substance should then be removed. The dose is 0.5 ml (liquid) or 0.5 g (solid) applied to the test site. The method consists of two tests: the initial test and the confirmatory test (used only if a corrosive effect is not observed in the initial test). All animals should be examined for signs of erythema and oedema during 14 days. The dermal irritation scores should be evaluated in conjunction with the nature and severity of lesions, and their reversibility or lack of reversibility. When responses persist to the end of the 14-day observation period, the test substance should be considered an irritant. |
| Eye Irritation | OECD 405 | This method provides information on health hazard likely to arise from exposure to test substance (liquids, solids and aerosols) by application on the eye. This Test Guideline is intended preferably for use with albino rabbit. The test substance is applied in a single dose in the conjunctival sac of one eye of each animal. The other eye, which remains untreated, serves as a control. The initial test uses an animal; the dose level depends on the test substance nature. A confirmatory test should be made if a corrosive effect is not observed in the initial test, the irritant or negative response should be confirmed using up to two additional animals. It is recommended that it be conducted in a sequential manner in one animal at a time, rather than exposing the two additional animals simultaneously. The duration of the observation period should be sufficient to evaluate fully the magnitude and reversibility of the effects observed. The eyes should be examined at 1, 24, 48, and 72 hours after test substance application. The ocular irritation scores should be evaluated in conjunction with the nature and severity of lesions, and their reversibility or lack of reversibility. Use of topical anesthetics and systemic analgesics to avoid or minimize pain and distress in ocular safety testing procedures is described. |

TABLE C-continued

OECD methods used in the tests in Table D, and a brief description

| Test assessment | OECD test method | Brief description |
|---|---|---|
| | OECD 438 | The Isolated Chicken Eye (ICE) test method is an in vitro test method that can be used to classify substances as "ocular corrosives and severe irritants". The ICE method uses eyes collected from chickens obtained from slaughterhouses where they are killed for human consumption, thus eliminating the need for laboratory animals. The eye is enucleated and mounted in an eye holder with the cornea positioned horizontally. The test substance and negative/positive controls are applied to the cornea. Toxic effects to the cornea are measured by a qualitative assessment of opacity, a qualitative assessment of damage to epithelium based on fluorescein retention, a quantitative measurement of increased thickness (swelling), and a qualitative evaluation of macroscopic morphological damage to the surface. The endpoints are evaluated separately to generate an ICE class for each endpoint, which are then combined to generate an Irritancy Classification for each test substance. |
| Skin Sensitisation (LLNA) | OECD 429 | The basic principle underlying the Local Lymph Node Assay (LLNA) in mouse is that sensitizers induce a primary proliferation of lymphocytes in the auricular lymph nodes draining the site of chemical application. This proliferation is proportional to the dose applied and provides a measurement of sensitisation. The method described is based on the use of radioactive labelling to measure cell proliferation. A minimum of four animals is used per dose group, with a minimum of three concentrations of the test substance, plus a negative control group treated with the vehicle only, and a positive control, as appropriate. The experimental schedule of the assay is during 6 days. Thereafter, the animals are killed and a cell suspension of lymph node cells is prepared. The incorporation of 3H-methyl thymidine is measured by¡Å-scintillation counting as disintegrations per minute (DPM). The Test Guideline includes performance standards that can be used to evaluate the validation status of new and/or modified test methods that are functionally and mechanistically similar to the LLNA. A reduced LLNA approach which could use up to 40% fewer animals is also described as an option. This study includes: measurements (weighing, DPM), and clinical daily observations. Results are expressed as the Stimulation Index (SI). The SI is obtained by calculation and should be¡Ÿ3 before classification of the test material as a skin sensitizer is warranted. |
| | OECD 406 | This method provides information on health hazard likely to arise from exposure to test substance via intradermical injection and/or epidermical application. In this Test Guideline, the methods preferred over other are: the Guinea Pig Maximisation Test (GPMT) of Magnusson and Kligman which uses adjuvant and the non adjuvant Buehler Test. This Test Guideline is intended primarily for use with guinea pig, but recently mouse models for assessing sensitisation potential have been developed. For the GPMT at least 10 animals in the treatment group and 5 in the control group are used. For the Buehler test, a minimum of 20 animals is used in the treatment group and at least 10 animals in the control group. The test animals are initially exposed to the test substance. Following a rest period, the induction period (10-14 days), during which an immune response may develop, then the animals are exposed to a challenge dose. The GPMT is made during approximately 23-25 days, the Buehler test, during approximately 30-32 days. The concentration of test substance used for each induction exposure should be well-tolerated systemically and should be the highest to cause mild-to moderate skin irritation, for the challenge exposure the highest nonirritant dose should be used. All skin reactions and any unusual findings should be observed and recorded (other procedures may be carried out to clarify doubtful reactions). |

TABLE D

Toxicological and safety studies

| | | Acute Oral, (mg/kg) | Acute Dermal, (mg/kg) | Acute Inhalation, (mg/L) | Skin Irritation | Eye Irritation | Skin Sensitisation (LLNA) |
|---|---|---|---|---|---|---|---|
| Example 1 | | >2000 | >5000 | >2.4 | No | Mild | Positive |
| | Test method | OECD 425 | OECD 402 | OECD 403 | OECD 404 | OECD 405 | OECD 429 |
| Example A | | 180 | >4000 | nt | Mild | Moderate | Positive |
| | Test method | OECD 223 | OECD 402 | n/a | OECD 404 | OECD 405 | OECD 429 |
| Example B | | 310 | >2000 | 3.12 | Mild | Mild | Positive |
| | Test method | OECD 425 | OECD 402 | OECD 403 | OECD 404 | OECD 405 | OECD 406 |
| Example 2 | | 1596 | nt | >2.0 | nt | Minimal | Negative |
| | Test method | OECD 425 | n/a | OECD 403 | n/a | OECD 405 | OECD 429 |
| Comparative J | | 310 | >2000 | >2.15 | Moderate | Mild | Negative |
| | Test method | OECD 425 | OECD 402 | OECD 403 | OECD 404 | OECD 405 | OECD 406 |
| Comparative K | | 310 | nt | nt | nt | No | nt |
| | Test method | OECD 425 | n/a | n/a | n/a | OECD 438 | n/a |
| Example 3 | | 341 | >5000 | 2.57 | Mildly irritant | Category III | Positive |
| | Test method | OECD 425 | OECD 402 | OECD 403 | OECD 404 | OECD 405 (EPA) | OECD 406 |
| Comparative L | | 103 | 5000 | 0.54-2.08 | Mildly irritant | Category IV | Negative |
| | Test method | OECD 425 | OECD 402 | OECD 403 | OECD 404 | OECD 405 (EPA) | OECD 406 | nt = not tested;
n/a = not applicable

The invention claimed is:

1. A composition comprising a microcapsule having a polyurea wall encapsulating lambda cyhalothrin and dispersed titanium dioxide particles, wherein the polyurea wall of the microcapsule is made of polyurea polymers derived from a mixture of aromatic polyisocyanate (A) and aromatic diisocyanate (B), provided that the d50 median particle size diameter of the titanium dioxide particles is from 0.15 to 0.5 microns, the d50 median diameter of the microcapsule in the composition is from 1 to 4, microns, the weight ratio of (A) to (B) is about 1:1, the polymer (or wall) content of each microcapsule is from 7 to 8% by weight, the amount of titanium dioxide is present in an amount of from 3.5 to 6% by weight and the amount of lambda cyhalothrin is from 40 to 50% by weight, each based on the weight of the microcapsule; and the amount of the microcapsule in the composition is from 47 to 53% by weight, based on the weight of the composition.

2. The composition according to claim 1, in which the aromatic polyisocyanate is polymethylene polyphenyliso-cyanate.

3. The composition according to claim 2, in which the aromatic diisocyanate is toluene diisocyanate.

4. The composition according to claim 3, in which the toluene diisocyanate is an isomeric mixture of toluene diisocyanate.

5. The composition according to claim 1, wherein the weight ratio of (A) to (B) is 1:1.

6. The composition according to claim 1, further comprising thiamethoxam wherein the thiamethoxam is not encapsulated.

7. The composition according to claim 6, further comprising lufenuron wherein the lufenuron is not encapsulated.

8. A composition having an organic phase and an aqueous phase, comprising:
   a polyurea polymer microcapsule encapsulating lambda-cyhalothrin;
   wherein the lambda-cyhalothrin is about 22.8% w/w;
   wherein the polyurea polymer of the microcapsule is about 3.8% w/w formed from isocyanate monomers, wherein the isocyanate monomers are a mixture of aromatic polyisocyanate (A) and aromatic diisocyanate (B) and the weight ratio of (A) to (B) is about 1:1;
   wherein the d50 diameter of the microcapsules is about 1.5-3.5 microns;
   wherein the organic phase of the composition is about 49.7% w/w; and
   wherein the aqueous phase of the composition is about 50.3% w/w.

9. The composition according to claim 8, in which the aromatic polyisocyanate is polymethylene polyphenyliso-cyanate.

10. The composition according to claim 9, in which the aromatic diisocyanate is toluene diisocyanate.

11. The composition according to claim 10, in which the toluene diisocyanate is an isomeric mixture of toluene diisocyanate.

12. The composition according to claim 8, wherein the weight ratio of (A) to (B) is 1:1.

13. A composition prepared by the steps, comprising: combining the composition of claim 8 with thiamethoxam, wherein the thiamethoxam is present in the composition at about 12.6% w/w of the composition.

14. A composition prepared by the steps, comprising: combining the composition of claim 8 with thiamethoxam and lufenuron, wherein the thiamethoxam is present in the composition at about 13.2% w/w of the composition and the lufenuron is present in the composition at about 6.6% w/w of the composition.

* * * * *